(12) United States Patent
Yamane et al.

(10) Patent No.: US 10,286,386 B2
(45) Date of Patent: May 14, 2019

(54) HYDROTREATING CATALYST FOR HYDROCARBON OIL, PROCESS FOR PRODUCING SAME, AND HYDROTREATING METHOD

(71) Applicant: JGC CATALYSTS AND CHEMICALS LTD., Saiwai-ku, Kawasaki-shi, Kanagawa (JP)

(72) Inventors: Kenji Yamane, Kitakyushu (JP); Shunsuke Ohashi, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 3 days.

(21) Appl. No.: 15/572,278

(22) PCT Filed: Apr. 7, 2016

(86) PCT No.: PCT/JP2016/061442
§ 371 (c)(1),
(2) Date: Nov. 7, 2017

(87) PCT Pub. No.: WO2016/189982
PCT Pub. Date: Dec. 1, 2016

(65) Prior Publication Data
US 2018/0104676 A1  Apr. 19, 2018

(30) Foreign Application Priority Data
May 27, 2015  (JP) .................. 2015-107670

(51) Int. Cl.
*B01J 21/04* (2006.01)
*B01J 23/85* (2006.01)
*B01J 23/881* (2006.01)
*B01J 23/882* (2006.01)
*B01J 23/883* (2006.01)
*B01J 23/888* (2006.01)
(Continued)

(52) U.S. Cl.
CPC ............... *B01J 27/19* (2013.01); *B01J 32/00* (2013.01); *B01J 35/10* (2013.01); *B01J 37/02* (2013.01);
(Continued)

(58) Field of Classification Search
CPC . B01J 21/04; B01J 23/85; B01J 23/862; B01J 23/864; B01J 23/866; B01J 23/881;
(Continued)

(56) References Cited

U.S. PATENT DOCUMENTS 4,624,938 A * 11/1986 Kemp ................... B01J 27/14
                                                  208/216 R
4,716,140 A * 12/1987 Kemp ................... B01J 27/188
                                                  208/216 R
(Continued)

FOREIGN PATENT DOCUMENTS

JP   5-317706 A   12/1993
JP   6-205990 A    7/1994
(Continued)

OTHER PUBLICATIONS

International Search Report of International Application No. PCT/JP2016/061442, dated Jul. 7, 2016.
(Continued)

*Primary Examiner* — Patricia L. Hailey
(74) *Attorney, Agent, or Firm* — Leydig, Voit & Mayer

(57) ABSTRACT

Provided herein is a hydrotreating catalyst for hydrocarbon oil having high desulfurization activity, and high abrasion strength and high compressive strength. A process for producing the hydrotreating catalyst is also provided. The hydrotreating catalyst uses an alumina-phosphorus support. The support contains 0.5 to 2.0 mass % of phosphorus in terms of an oxide. The support loads a metal in Group 6A of the periodic table, and a metal in Group 8 of the periodic
(Continued)

table. The hydrotreating catalyst has a specific surface area of 150 m²/g or more. The hydrotreating catalyst has a total pore volume of 0.40 to 0.75 ml/g as measured by a mercury intrusion method. The hydrotreating catalyst has two maximal peaks in a pore diameter range of 6 nm to 13 nm in a log differential pore volume distribution measured by a mercury intrusion method. The hydrotreating catalyst has an abrasion strength of 0.5% or less. The hydrotreating catalyst has a compressive strength of 15 N/mm or more. The support is produced from, for example, a hydrate obtained by adding phosphorus to an alumina hydrate obtained by using two mixtures of an acidic aqueous aluminum salt solution and a basic aqueous aluminum salt solution.

7 Claims, 2 Drawing Sheets

(51) Int. Cl.
    *B01J 27/188*      (2006.01)
    *B01J 27/19*      (2006.01)
    *B01J 37/03*      (2006.01)
    *B01J 37/04*      (2006.01)
    *B01J 32/00*      (2006.01)
    *B01J 35/10*      (2006.01)
    *B01J 37/02*      (2006.01)
    *C10G 45/08*      (2006.01)

(52) U.S. Cl.
    CPC ............. *B01J 37/03* (2013.01); *B01J 37/04* (2013.01); *C10G 45/08* (2013.01)

(58) Field of Classification Search
    CPC ...... B01J 23/882; B01J 23/883; B01J 23/888; B01J 27/188; B01J 27/19; B01J 35/10; B01J 37/03; B01J 37/04; C10G 45/08
    USPC ......... 502/210, 313–316; 208/112, 123, 124, 208/143; 423/625, 626
    See application file for complete search history.

(56) References Cited

U.S. PATENT DOCUMENTS

| | | | |
|---|---|---|---|
| 5,215,955 A | 6/1993 | Threlkel | |
| 5,403,806 A * | 4/1995 | Simpson | B01J 23/85 502/210 |
| 5,468,371 A | 11/1995 | Nelson et al. | |
| 6,015,485 A * | 1/2000 | Shukis | B01J 21/04 208/108 |
| 6,037,306 A * | 3/2000 | Xia | B01J 23/85 502/208 |
| 6,589,908 B1 | 7/2003 | Ginestra et al. | |
| 6,890,647 B1 | 5/2005 | Nishida et al. | |
| 7,265,075 B2 * | 9/2007 | Tsukada | B01J 21/04 423/625 |
| 7,442,361 B1 | 10/2008 | Gloeckler et al. | |
| 7,737,071 B2 * | 6/2010 | Kiriyama | B01J 21/12 208/133 |
| 7,790,652 B2 * | 9/2010 | Ackerman | B01J 21/04 423/625 |
| 2003/0044348 A1* | 3/2003 | Sato | B01J 21/04 423/626 |
| 2013/0105364 A1 | 5/2013 | Bhan | |
| 2014/0243192 A1 | 8/2014 | Yamane et al. | |
| 2014/0315712 A1* | 10/2014 | Smegal | B01J 23/883 502/313 |
| 2014/0367311 A1 | 12/2014 | Yu et al. | |
| 2016/0228858 A1 | 8/2016 | Osaki et al. | |

FOREIGN PATENT DOCUMENTS

| | | |
|---|---|---|
| JP | 7-286184 A | 10/1995 |
| JP | 2002-186857 A | 7/2002 |
| JP | 2003-503304 A | 1/2003 |
| JP | 2004-523340 A | 8/2004 |
| JP | 2013-91010 A | 5/2013 |
| WO | WO 2001/016026 A1 | 3/2001 |
| WO | WO 2013/192394 A1 | 12/2013 |
| WO | WO 2014/162967 A1 | 10/2014 |
| WO | WO 2015/046323 A1 | 4/2015 |

OTHER PUBLICATIONS

Lewis, J. A. et al, 'The effect of conditions of preparation on the form of alumina. I. Precipitation and subsequent calcination of products in the system aluminium sulphate-sodium aluminate-water,' Journal of Applied Chemistry, (Apr. 1958), vol. 8, No. 4, p. 223-228, DOI:10.1002/jctb.5010080405.

European Patent Office, Extended European Search Report in counterpart European Application No. 16 799 690.9, dated Apr. 24, 2018.

* cited by examiner

HYDROTREATING CATALYST FOR HYDROCARBON OIL, PROCESS FOR PRODUCING SAME, AND HYDROTREATING METHOD

TECHNICAL FIELD

The present invention relates to the technical field of hydrotreating catalysts for removing sulfur from hydrocarbon oil in the presence of hydrogen.

BACKGROUND ART

The hydrotreating process of heavy hydrocarbon oils such as residual oils containing metal contaminants is a process in which a hydrocarbon oil is subjected to hydrodesulfurization and hydrodemetallation under high-temperature and high-pressure reaction conditions in a stream of hydrogen. The reactions are performed in a fixed bed reaction column charged with a demetallation catalyst having high demetallation selectivity, and a desulfurization catalyst having high desulfurization selectivity.

As the trend for using heavier feedstock oils, and the demand for reducing the load on the fluid catalytic cracking process performed after the hydrotreatment process continue to rise, the catalysts for hydrotreating process are required to satisfy high desulfurization performance and high catalyst stability. In order to reduce cracking and powderization during regeneration of a used catalyst, the catalysts should also desirably have sufficient strength and abrasion strength even before use.

PTL 1 describes a technique whereby a calcium compound is contained in a support primarily made of alumina to improve demetallation performance, and to reduce cracking and powderization even in regenerating a catalyst. Calcium has strong affinity to vanadium, and facilitates demetallation reaction. Calcium also allows vanadium to be immobilized in a catalyst, and improves regeneration performance. However, when a calcium compound having a small surface area is added, the surface area of the catalyst becomes smaller, and improvements are needed for desulfurization performance and desulfurization stability.

PTL 2 discloses a technique for making a wider pore distribution for a hydrotreating catalyst using an alumina-phosphorus support. The technique is intended to improve demetallation performance and deasphaltene performance. The technique is desirable in terms of demetallation reactivity of macromolecules such as asphaltenes, but needs improvements in desulfurization performance and desulfurization stability.

CITATION LIST

Patent Literature

PTL 1: JP-A-2002-186857: claim 1, paragraphs 0014 to 0018
PTL 2: JP-A-2013-91010: claim 1, paragraphs 0012 to 0019

SUMMARY OF INVENTION

Technical Problem

An object of the invention is to provide a hydrotreating catalyst for hydrocarbon oil having high desulfurization activity, and high abrasion strength and high compressive strength, and a process for producing such a hydrotreating catalyst. The invention is also intended to provide a hydrotreating method for hydrocarbon oil whereby sulfur can be removed from hydrocarbon oil at high efficiency.

Solution to Problem

A first invention is a hydrotreating catalyst for hydrocarbon oil using an alumina-phosphorus support,
(1) the support containing 0.5 to 2.0 mass % of phosphorus in terms of $P_2O_5$,
(2) the support loading a metal in Group 6A of the periodic table, and a metal in Group 8 of the periodic table,
(3) the hydrotreating catalyst having a specific surface area of 150 $m^2/g$ or more,
(4) the hydrotreating catalyst having a total pore volume of 0.40 to 0.75 ml/g as measured by a mercury intrusion method,
(5) the hydrotreating catalyst having two maximal peaks in a pore diameter range of 6 nm to 13 nm in a log differential pore volume distribution measured by a mercury intrusion method,
(6) the hydrotreating catalyst having an abrasion strength of 0.5% or less, and
(7) the hydrotreating catalyst having a compressive strength of 15 N/mm or more.

The first invention may have the following features.
(i) The metal in Group 6A of the periodic table is at least one of chromium, molybdenum, and tungsten, and the metal in Group 8 of the periodic table is at least one of iron, nickel, and cobalt.
(ii) The support has an absorbance ratio Sb/Sa of 0.30 to 0.60, wherein Sb is the absorbance Sb of a spectral peak in a wavenumber range of 3,770 to 3,774 $cm^{-1}$ corresponding to a basic OH group, and Sa is the absorbance Sa of a spectral peak in a wavenumber range of 3,674 to 3,678 $cm^{-1}$ corresponding to an acidic OH group as measured with a transmission Fourier transformation infrared spectrophotometer.

A second invention is a process for producing a hydrotreating catalyst for hydrocarbon oil using an alumina-phosphorus support,
the process comprising:
(1) a first step of adding a basic aqueous aluminum salt solution to an acidic aqueous aluminum salt solution having an adjusted pH of 2 to 5 to make the pH 7 to 10, and washing the resulting alumina hydrate to obtain an alumina hydrate (A) that is free of a by-product salt;
(2) a second step of adding an acidic aqueous aluminum salt solution to a basic aqueous aluminum salt solution to make the pH 6 to 8, and washing the resulting alumina hydrate to obtain an aluminum hydrate (B) that is free of a by-product salt;
(3) a third step of mixing the aluminum hydrates (A) and (B), and adding phosphorus to the mixture to obtain an alumina-phosphorus hydrate;
(4) a fourth step of aging, kneading, molding, drying, and calcining the alumina-phosphorus hydrate in series to obtain an alumina-phosphorus support; and
(5) a fifth step of loading a metal in Group 6A of the periodic table, and a metal in Group 8 of the periodic table on the support.

A third invention is a method for hydrotreating a hydrocarbon oil, the method comprising contacting the hydrocarbon oil to the hydrotreating catalyst of claim 1 at a temperature of 350 to 450° C., a pressure of 3 to 20 MPa, and a liquid hourly space velocity of 0.1 to 3 hr$^{-1}$ in the presence of hydrogen.

Advantageous Effects of Invention

The hydrotreating catalyst for hydrocarbon oil using an alumina-phosphorus support according to the invention has two maximal peaks in a pore diameter range of 6 nm to 13 nm in a log differential pore volume distribution measured by a mercury intrusion method. Accordingly, particle mixing occurs between relatively larger pores and relatively smaller pores. Specifically, smaller particles enter the space between larger particles, and provide high abrasion strength and high compressive strength for the support.

Further, because the absorbance ratio Sb/Sa between the absorbance Sb of a basic OH group and the absorbance Sa of an acidic OH group is in a range of 0.30 to 0.60 as measured by using a transmission Fourier transformation infrared spectrophotometer, the hydroactive metals loaded on the support can have high dispersibility, and high desulfurization performance.

DESCRIPTION OF EMBODIMENTS

Figure 1:
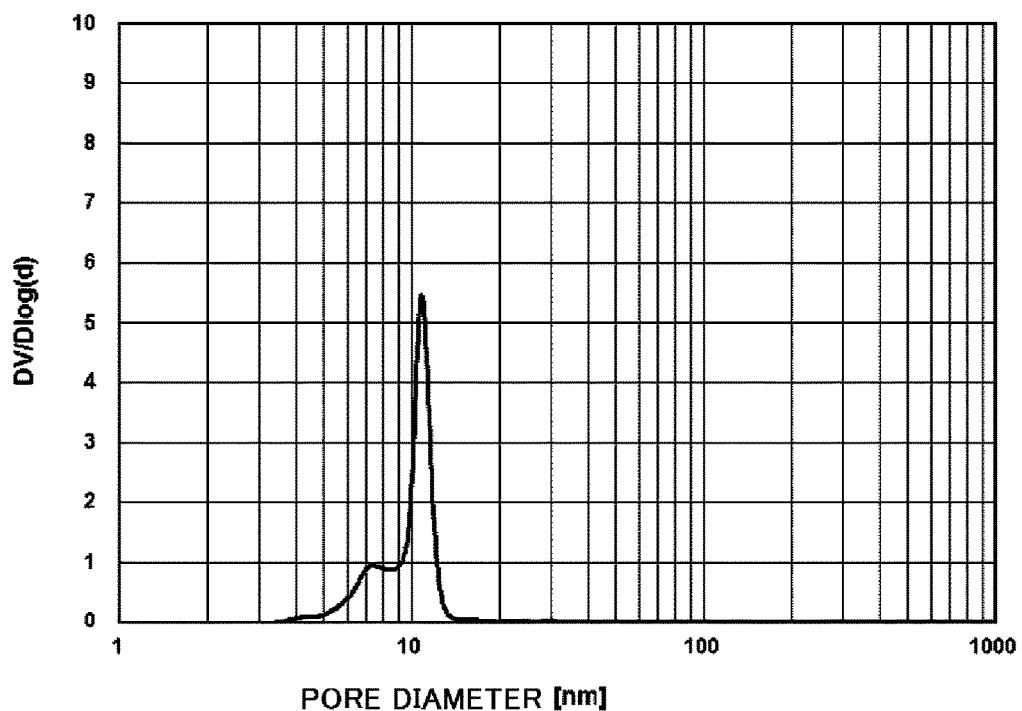
FIG. 1 is a graph representing a log differential pore volume distribution of an example of a hydrotreating catalyst of the invention.

The invention is a hydrotreating catalyst for hydrocarbon oil using an alumina-phosphorus support (hereinafter, referred to as "present catalyst"). The following describes an embodiment of the present catalyst, and an embodiment of a process for producing the present catalyst.

Support Contains Phosphorus

The alumina-phosphorus support constituting the present catalyst contains 0.5 to 2.0 mass % of phosphorus in terms of a $P_2O_5$ concentration with respect to the total support amount. The phosphorus content is more preferably 0.8 to 1.8 mass %. The catalyst strength may become weaker when the phosphorus content in the support is less than 0.5 mass %. When the phosphorus content exceeds 2.0 mass %, the pore volume in a pore diameter range of 15 to 1,000 nm becomes excessively large, and the catalyst strength may become weaker. This may also lead to reduced catalyst bulk density, and poor catalyst performance. The alumina-phosphorus support may contain only oxides of alumina and phosphorus, or may additionally contain inorganic oxides of silica, boria, titania, zirconia, and manganese, for example.

Support Loads Hydroactive Metals

In the present catalyst, metals in Group 6A and Group 8 of the periodic table are loaded as hydroactive metals on the support. The hydroactive metal is loaded in an amount of preferably 5 to 30 mass % in terms of an oxide with respect to the total catalyst amount. With the hydroactive metal loaded in an amount of 5 mass % or more, the invention can more effectively show effects. The hydroactive metal is loaded in an amount of preferably 30 mass % or less because it enables maintaining demetallation performance (demetallation selectivity) and catalytic activity stability, and reducing the production cost. Preferred as the Group 6A metals are chromium, molybdenum, and tungsten. Preferred as the Group 8 metals are iron, nickel, and cobalt.

Specific Surface Area (SA)

The present catalyst has a specific surface area of 150 m$^2$/g or more. When the specific surface area is less than 150 m$^2$/g, the desulfurization reaction rate tends to decrease, though the effect on demetallation performance remains small in this range of specific surface area. As used herein, "specific surface area" is a measured value by the BET method.

Pore Volume (PV)

The present catalyst has a total pore volume of 0.40 to 0.75 ml/g as measured by a mercury intrusion method. When the total pore volume is less than 0.40 ml/g, desulfurization performance tends to decrease due to blocking of pores by metal. The catalyst strength tends to decrease when the total pore volume is larger than 0.75 ml/g. As used herein, "total pore volume" means a pore volume in a pore diameter range of 3 to 9,000 nm (the upper and lower values of analyzed raw data). The pore diameter is a calculated value based on a mercury surface tension of 480 dyne/cm, and a contact angle of 130°.

Pore Volume Distribution

The present catalyst has two maximal peaks in a pore diameter range of 6 nm to 13 nm in a log differential pore volume distribution measured by a mercury intrusion method. Demetallation performance becomes poor when either or both of these maximal peaks are in a pore diameter range below 6 nm. Desulfurization performance tends to deteriorate when either or both of the two maximal peaks are in a pore diameter range above 13 nm. With the two maximal peaks occurring in a pore diameter range of 6 nm to 13 nm, particle mixing occurs between relatively larger pores and relatively smaller pores. Specifically, smaller particles enter in the space between larger particles, and provide high abrasion strength and high compressive strength for the support.

FIG. 1 represents an exemplary log differential pore volume distribution created for the present catalyst. The horizontal axis represents pore diameter, and the vertical axis represents values obtained by dividing the differential pore volume dV by the logarithmic differential value d (log D) of pore diameter. FIG. 1 corresponds to Example 1 to be described later.

Abrasion Strength

The present catalyst has an abrasion strength of 0.5% or less. When the abrasion strength of the catalyst exceeds 0.5%, cracking and powderization tend to occur also in regeneration of a used catalyst. The abrasion strength is a measured value based on ASTM D4058-81.

Compressive Strength

The present catalyst has a compressive strength of 15 N/mm or more. When the compressive strength of the catalyst is less than 15 N/mm, the catalyst tends to break when being charged, and drifting or pressure loss may occur during reaction. Compressive strength is also called crush strength. In the invention, the compressive strength is a measured value using a Kiya hardness meter.

Acidic OH Group and Basic OH Group in Support

Figure 2:
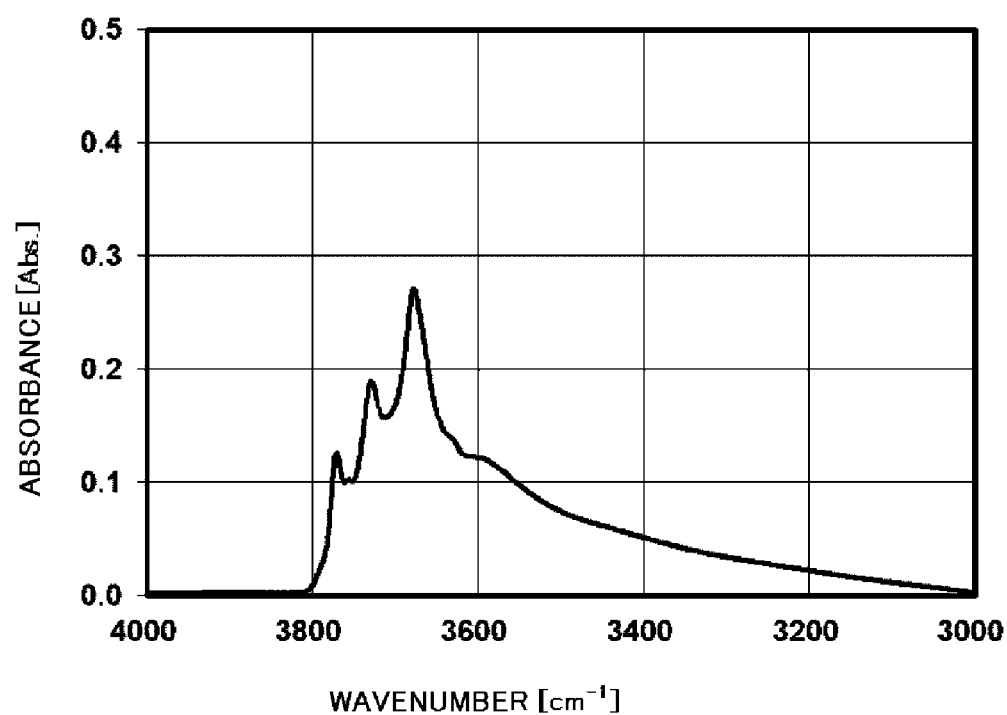
FIG. 2 shows the result of a measurement performed for the hydrotreating catalyst using a transmission Fourier transformation infrared spectrophotometer.

The support of present catalyst has an absorbance ratio Sb/Sa of 0.30 to 0.60, wherein Sb is the absorbance Sb of the spectral peak in a wavenumber range of 3,770 to 3,774 cm$^{-1}$ corresponding to a basic OH group, and Sa is the absorbance Sa of the spectral peak in a wavenumber range of 3,674 to 3,678 cm$^{-1}$ corresponding to an acidic OH group as measured by using a transmission Fourier transformation infrared spectrophotometer. The absorbance ratio Sb/Sa is more preferably 0.40 to 0.50. As is known, active metals show different dispersibility depending on the characteristics of the alumina support surface. By optimizing the ratio of an acidic OH group and a basic OH group as above for the OH groups on the support surface, and from the fact that the support is an alumina-phosphorus support, it is possible to improve the dispersibility of the hydroactive metals, and desulfurization performance. FIG. 2 represents an example of a photoabsorption spectrum of the support of the present catalyst, including a wavenumber range of 3,674 to 3,678 $cm^{-1}$ corresponding to an acidic OH group, and a wavenumber range of 3,770 to 3,774 $cm^{-1}$ corresponding to a basic OH group. (Example 1: the phosphorus content in the support is 1.0 mass % in terms of a $P_2O_5$ concentration.) In this example, the absorbance Sa of the spectral peak corresponding to an acidic OH group is 0.27, and the absorbance Sb of the spectral peak corresponding to a basic OH group is 0.13. The absorbance ratio Sb/Sa is 0.48 accordingly.

The specific procedures of absorbance measurement are described below. A sample (20 mg) is charged into a molding container (inner diameter ϕ of 20 mm), and is molded into a thin disc shape by being compressed under an applied pressure of 4 ton/$cm^2$ (39,227 N/$cm^2$). The molded body is maintained at 500° C. for 2 hours in a vacuum of $1.0 \times 10^{-3}$ Pa or less, and measured for absorbance after being cooled to room temperature.

Specifically, the absorbance was measured with a TGS detector at a resolution of 4 $cm^{-1}$ for 200 runs, and the baseline was corrected for a wavenumber range of 3,000 to 4,000 $cm^{-1}$, followed by correction with the specific surface area. The absorbance was converted to a value per unit surface area, and a value per unit mass.

Absorbance per unit surface area ($m^{-2}$)=absorbance/mass of molded body×specific surface area Absorbance per unit mass ($g^{-1}$)=absorbance/mass of molded body A preferred embodiment for producing the present catalyst is described below.

Alumina-Phosphorus Support Producing Process

First Step

An acidic aluminum salt is added to weighed water to prepare an acidic aluminum aqueous solution that contains, for example, 0.1 to 2.0 mass % of $Al_2O_3$, and has a pH of 2.0 to 5.0. The acidic aluminum aqueous solution is then heated to a liquid temperature of, for example, 50 to 80° C. while being stirred. The acidic aluminum salt is a water-soluble salt, and may be, for example, aluminum sulfate, aluminum chloride, aluminum acetate, or aluminum nitrate. Preferably, the aqueous solution contains 0.5 to 20 mass % of an acidic aluminum salt in terms of $Al_2O_3$.

While stirring the acidic aluminum aqueous solution, a basic aluminum aqueous solution is added thereto for, for example, 30 to 200 minutes to make the pH 7 to 10, and obtain an alumina hydrate. The alumina hydrate is then washed with, for example, 40 to 70° C. purified water, and impurity by-product salts such as sodium, and sulfate radicals are removed to obtain a cake-like alumina hydrate (A). Examples of the basic aluminum salt include sodium aluminate, and potassium aluminate. Preferably, the aqueous solution contains 2 to 30 mass % of a basic aluminum salt in terms of $Al_2O_3$.

Second Step

A basic aluminum salt is added to weighed water to prepare a basic aluminum aqueous solution that contains, for example, 2.0 to 7.0 mass % of $Al_2O_3$, and has a pH of 12 to 14. The basic aluminum aqueous solution is then heated to a liquid temperature of, for example, 40 to 80° C. while being stirred.

While stirring the basic aluminum aqueous solution, an acidic aluminum aqueous solution is added thereto for, for example, 5 to 30 minutes to make the pH 6 to 8, and obtain an alumina hydrate. The alumina hydrate is then washed with, for example, 40 to 70° C. purified water, and impurity by-product salts such as sodium salts, and sulfates are removed to obtain a cake-like alumina hydrate (B). Examples of the basic aluminum salt include the same chemicals exemplified in the first step. Preferably, the aqueous solution contains 2 to 30 mass % of a basic aluminum salt in terms of $Al_2O_3$. Examples of the acidic aluminum salt include the same chemicals exemplified in the first step. Preferably, the aqueous solution contains 2 to 30 mass % of an acidic aluminum salt in terms of $Al_2O_3$.

Third Step

Purified water is added, and mixed with each of the cake-like alumina hydrates (A) and (B), and these are mixed to obtain a slurry-like alumina hydrate. Phosphorus is then added to the slurry-like alumina hydrate to obtain an alumina-phosphorus hydrate. Phosphorus is added to make the phosphorus content, for example, 0.5 to 2.0 mass % in the support in terms of a $P_2O_3$ concentration. The phosphorus source may be a phosphoric acid compound, for example, such as phosphoric acid, phosphorous acid, ammonia phosphate, potassium phosphate, and sodium phosphate. The mixture ratio of alumina hydrate (A) and alumina hydrate (B) is A/B>0.7. When A/B<0.7, only a single maximal peak occurs in a pore diameter range of 6 nm to 13 nm, and abrasion strength and compressive strength deteriorate.

Fourth Step

The alumina-phosphorus hydrate obtained in the third step is aged in an aging tank equipped with a reflux condenser at 30° C. or more, preferably 80 to 100° C., for, for example 1 to 10 hours. The aged product is, for example, kneaded under heat to obtain a moldable kneaded product using a common means, and molded into the desired shape by, for example, extrusion molding. After being dried, the product is calcined at 400 to 800° C. for 0.5 to 10 hours to obtain an alumina-phosphorus support.

Fifth Step

The alumina-phosphorus support can then be used to produce a hydrotreating catalyst of the invention by loading a metal selected from Group 6A of the periodic table, and a metal selected from Group 8 of the periodic table, using a common means. Examples of the feedstock of such metals include metallic compounds such as nickel nitrate, nickel carbonate, cobalt nitrate, cobalt carbonate, molybdenum trioxide, ammonium molybdate, and ammonium paratungstate. The metals are loaded on the support using known methods, such as an impregnation method, and an immersion method. The support with the loaded metals is calcined at typically 400 to 600° C. for 0.5 to 5 hours to obtain a hydrotreating catalyst of the invention.

The catalyst having two maximal peaks in a pore diameter range of 6 nm to 13 nm in a log differential pore volume distribution can be obtained by using the support obtained by mixing the alumina hydrate (A) obtained by adding a basic aqueous aluminum salt solution to an acidic aqueous aluminum salt solution, and the alumina hydrate (B) obtained by adding an acidic aqueous aluminum salt solution to a basic aqueous aluminum salt solution, in the manner described in the first to third steps above.

The specific surface area, and the total pore volume of the present catalyst also can be controlled by varying the amount of the phosphorus added.

The hydrotreating catalyst of the invention has use in a hydrotreatment of heavy hydrocarbon oils such as residual oils containing metal contaminants such as vanadium, and nickel, and may be produced by using existing hydrotreatment devices, and the procedures used for these devices. As an example of such procedures, a heavy hydrocarbon oil is contacted to the hydrotreating catalyst of the invention at a temperature of 350 to 450° C., a pressure of 3 to 20 MPa, and a liquid hourly space velocity of 0.1 to 3 $hr^{-1}$ in the presence of hydrogen.

Production of the present catalyst is simple and highly productive, and has a cost advantage.

EXAMPLES

The invention is described below in greater detail using Examples. The invention, however, is not limited by the following.

Example 1

Purified water (35.2 kg) was filled into a tank equipped with a circulation line having two chemical inlets. An acidic aqueous aluminum salt solution, specifically 13.0 kg of an aluminum sulfate aqueous solution (7 mass % in terms of $Al_2O_3$) was added while being stirred, and the mixture was heated to 60° C., and circulated. Here, the alumina aqueous solution (A1) had a pH of 2.3. Thereafter, a basic aqueous aluminum salt solution, specifically 9.5 kg of a sodium aluminate aqueous solution (22 mass % in terms of $Al_2O_3$) was added to the alumina aqueous solution (A1) for 180 minutes at the maintained temperature of 70° C. while being stirred and circulated, and an alumina hydrate (A) was obtained. The mixture had a pH of 9.5. The alumina hydrate (A) was then washed with 60° C. purified water, and impurities such as sodium, and sulfate radicals were removed. Purified water was added to the washed cake to make the $Al_2O_3$ concentration 8 mass %, and the solution was aged at 95° C. for 3 hours in an aging tank equipped with a reflux condenser to obtain a cake-like alumina hydrate (A).

Separately, purified water (31 kg) was filled into a tank equipped with a steam jacket, and a basic aqueous aluminum salt solution, specifically 9.09 kg of a sodium aluminate aqueous solution (22 mass % in terms of $Al_2O_3$) was added while being stirred. The mixture was then heated to 60° C., and circulated. Here, the alumina aqueous solution (B1) had a pH of 13. Thereafter, an acidic aqueous aluminum salt solution, specifically 40 kg of an aluminum sulfate aqueous solution (2.5 mass % in terms of $Al_2O_3$) was added at a constant rate (for 10 minutes) with a roller pump until the pH of the mixed aqueous solution became 7.2. The washed cake-like slurry was then diluted with ion-exchange water to make the $Al_2O_3$ concentration 10 mass %. After dilution, the pH was brought to 10.5 with 15 mass % ammonia water. The product was then aged at 95° C. for 10 hours in an aging tank equipped with a reflux condenser to obtain an alumina hydrate (B).

The cake-like alumina hydrates (A) and (B), 1.5 kg each in terms of an $Al_2O_3$ oxide, were mixed, and purified water was added to make the $Al_2O_3$ concentration 8 mass %. Thereafter, 49.0 g of phosphoric acid (61.6 mass % in terms of $P_2O_5$) was added to the mixture of the alumina hydrates (A) and (B). The mixture was then stirred for 1 hour to obtain an alumina-phosphorus hydrate. After being stirred, the slurry was dehydrated, and concentrated and kneaded until the moisture content reached a predetermined level, using a twin-arm kneader equipped with a steam jacket. The knead product was then extrusion molded into a 1.7-mm four-leaf columnar shape using an extrusion molding machine. The alumina molded product was dried at 110° C. for 12 hours, and calcined at 500° C. for 3 hours to obtain an alumina-phosphorus support a. The support a contained 1 mass % of phosphorus in terms of $P_2O_5$, and 99 mass % of aluminum in terms of $Al_2O_3$ (the contents are with respect to the total support amount).

A molybdenum oxide (70.6 g), and a nickel carbonate (32.1 g) were suspended in 300 ml of ion-exchange water, and the suspension was superheated at 95° C. for 5 hours after an appropriate reflux process performed to prevent liquid volume reduction. Thereafter, 44.1 g of citric acid was added, and dissolved to produce an impregnation solution. The impregnation solution was sprayed, and impregnated in 500 g of support a, and the support a was dried at 250° C., and calcined in an electric furnace at 550° C. for 1 hour to obtain a hydrotreating catalyst (hereinafter, also referred to simply as "catalyst") A. The metallic components of the catalyst A were 12 mass % $MoO_3$ (with respect to the total catalyst amount), and 3 mass % NiO (with respect to the total catalyst amount). The properties of the catalyst A are shown in Table 1. The compressive strength was measured using a Kiya hardness meter (Fujiwara Scientific Company Co., Ltd.). The abrasion strength values are based on ASTM D4058-81. FIG. 1 shows the log differential pore volume distribution of catalyst A measured by a mercury intrusion method. FIG. 2 shows the result of the measurement performed for support a using a transmission Fourier transformation infrared spectrophotometer (FT-IR-6100, available from JASCO Corporation).

Example 2

An alumina-phosphorus support b was obtained in the same manner as in Example 1, except that 74.2 g of phosphoric acid was added. The support b contained 1.5 mass % of phosphorus in terms of $P_2O_5$, and 98.5 mass % of aluminum in terms of $Al_2O_3$ (the contents are with respect to the total support amount). Catalyst B was obtained using support b, in the same manner as in Example 1. The metallic components of catalyst B were 12 mass % $MoO_3$ (with respect to the total catalyst amount), and 3 mass % NiO (with respect to the total catalyst amount). The properties of catalyst B are shown in Table 1.

Example 3

An alumina-phosphorus support c was obtained in the same manner as in Example 1, except that 2.1 kg of alumina hydrate (A) in terms of an $Al_2O_3$ oxide, and 0.9 kg of alumina hydrate (B) in terms of an $Al_2O_3$ oxide were mixed. The support c contained 1 mass % of phosphorus in terms of $P_2O_5$, and 99 mass % of aluminum in terms of $Al_2O_3$ (the contents are with respect to the total support amount). Catalyst C was obtained using support c, in the same manner as in Example 1. The metallic components of catalyst C were 12 mass % $MoO_3$ (with respect to the total catalyst amount), and 3 mass % NiO (with respect to the total catalyst amount). The properties of catalyst C are shown in Table 1.

Example 4

Catalyst D was obtained in the same manner as in Example 1, except that 28.9 g of cobalt carbonate was used instead of nickel carbonate. The metallic components of catalyst D were 12 mass % $MoO_3$ (with respect to the total catalyst amount), and 3 mass % CoO (with respect to the total catalyst amount). The properties of catalyst D are shown in Table 1.

Example 5

Catalyst E was obtained in the same manner as in Example 1, except that 73.2 g of molybdenum oxide, and 33.3 g of nickel carbonate were used, and that 29.7 g of phosphoric acid was used instead of citric acid. The metallic components of catalyst E were 12 mass % $MoO_3$ (with respect to the total catalyst amount), and 3 mass % NiO (with respect to the total catalyst amount). The total phosphorus content of the catalyst E, including the phosphorus in the support, was 4.0 mass %. The properties of catalyst E are shown in Table 1.

Comparative Example 1

An alumina support d was obtained in the same manner as in Example 1, except that phosphoric acid was not used. Catalyst F was obtained using support d, in the same manner as in Example 1. The metallic components of catalyst F were 12 mass % $MoO_3$ (with respect to the total catalyst amount), and 3 mass % NiO (with respect to the total catalyst amount). The properties of catalyst F are shown in Table 1.

Comparative Example 2

An alumina-phosphorus support e was obtained in the same manner as in Example 1, except that 310.9 g of phosphoric acid was added. The support e contained 6 mass % of phosphorus in terms of $P_2O_5$, and 94 mass % of aluminum in terms of $Al_2O_3$ (the contents are with respect to the total support amount). Catalyst G was obtained using support e, in the same manner as in Example 1. The metallic components of catalyst G were 12 mass % $MoO_3$ (with respect to the total catalyst amount), and 3 mass % NiO (with respect to the total catalyst amount). The properties of catalyst G are shown in Table 1.

Comparative Example 3

An alumina-phosphorus support f was obtained in the same manner as in Example 1, except that 3.0 kg of alumina hydrate (A) in terms of an $Al_2O_3$ oxide, and 0 kg of alumina hydrate (B) in terms of an $Al_2O_3$ were mixed. The support f contained 1 mass % of phosphorus in terms of $P_2O_5$, and 99 mass % of aluminum in terms of $Al_2O_3$ (the contents are with respect to the total support amount). Catalyst H was obtained using support f, in the same manner as in Example 1. The metallic components of catalyst H were 12 mass % $MoO_3$ (with respect to the total catalyst amount), and 3 mass % NiO (with respect to the total catalyst amount). The properties of catalyst H are shown in Table 1.

Test for Evaluation of Catalyst Activity

Catalysts A to E of Examples 1 to 5, and catalysts F to H of Comparative Examples 1 to 3 were examined for hydrodemetallation activity and desulfurization activity using a fixed-bed microreactor. The test was conducted under the following conditions. A commercially available demetallation catalyst CDS-DM5 was charged in 50% of the upper stage, whereas a commercially available desulfurization catalyst CDS-R25N or the catalysts A to H were charged in 50% of the lower stage.

Reaction Conditions

Charged catalyst amount: 400 ml (200 ml of commercially available demetallation catalyst, and catalysts A to H, 200 ml each)
Reaction pressure: 13.5 MPa
Liquid hourly space velocity (LHSV): 0.3 $hr^{-1}$
Hydrogen/oil ratio ($H_2$/HC): 800 $Nm^3$/kl
Reaction temperature: 370° C.

An atmospheric residual oil of the following properties was used as the feedstock oil.

Properties of Feedstock Oil
Density (15° C.): 0.9761 $g/cm^3$
Asphaltene content: 3.4 mass %
Sulfur content: 4.143 mass %
Metal (Ni+V) amount: 80.5 ppm by mass In the activity test, demetallation activity and desulfurization activity (relative activities) were calculated using a reaction rate constant determined from an Arrhenius plot, in which the reaction rate constant from the result of a CDS-DM5/CDS-R25N combined evaluation was assumed to be 100%. The reaction rate constant was determined using the following formula (1).

$$K_n = LHSV \times 1/(n-1) \times (1/P^{n-1} - 1/F^{n-1})$$ Formula (1)

$K_n$: Reaction rate constant
n: The symbol n represents whether the reaction rate is proportional to what power of the metal or sulfur concentration in the feedstock oil (1.01 for demetallation reaction, and 2.0 for desulfurization reaction)
P: metal concentration in treated oil (ppm by mass), sulfur concentration (%)
F: Metal concentration in feedstock oil (ppm by mass), sulfur concentration (%)
LHSV: Liquid hourly space velocity ($hr^{-1}$)

The demetallation activity values, and the desulfurization activity values of catalysts A to H are shown in Table 1.

TABLE 1

|  |  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|---|
| Support |  | a | b | c | a | a | d | e | f |
| Alumina hydrate A/B |  | 5/5 | 5/5 | 7/3 | 5/5 | 5/5 | 5/5 | 5/5 | 10/0 |
| P2O5 amount | Mass % | 1% | 1.5% | 1% | 1% | 1% | 0% | 6% | 1% |
| Sb/Sa |  | 0.46 | 0.42 | 0.46 | 0.46 | 0.46 | 0.53 | 0.19 | 0.47 |
| Catalyst |  | A | B | C | D | E | F | G | H |
| Amount of loaded metal | Mass % | MoO3/NiO 12/3 | MoO3/NiO 12/3 | MoO3/NiO 12/3 | MoO3/CoO 12/3 | MoO3/NiO 12/3 | MoO3/NiO 12/3 | MoO3/NiO 12/3 | MoO3/NiO 12/3 |
|  | Solvent | Citric acid | Citric acid | Citric acid | Citric acid | Phosphoric acid | Citric acid | Citric acid | Citric acid |
| SA | m2/g | 223 | 225 | 218 | 224 | 217 | 214 | 228 | 202 |
| PV | ml/g | 0.58 | 0.58 | 0.59 | 0.58 | 0.57 | 0.59 | 0.61 | 0.69 |
| Maximal peak between 6 and 13 nm (large) | nm | 10.8 | 10.9 | 11.2 | 11.0 | 10.7 | 11.5 | 12.1 | 14.8 |

TABLE 1-continued

|  |  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|---|
| Maximal peak between 6 and 13 nm (small) | nm | 7.30 | 7.20 | 7.50 | 7.20 | 7.20 | Absent | 6.70 | Absent |
| Abrasion Strength | % | 0.20 | 0.20 | 0.20 | 0.20 | 0.20 | 1.20 | 0.20 | 0.7 |
| Compressive strength | N/mm | 32.0 | 33.0 | 33.0 | 31.0 | 32.0 | 21.0 | 34.0 | 19.0 |
| Relative activity |  |  |  |  |  |  |  |  |  |
| Demetallation activity | % | 99 | 98 | 102 | 97 | 100 | 97 | 98 | 105 |
| Desulfurization activity | % | 120 | 119 | 118 | 118 | 121 | 116 | 98 | 90 |

The invention claimed is:

1. A hydrotreating catalyst for hydrocarbon oil using an alumina-phosphorus mixture support,
   (1) the support containing 0.5 to 2.0 mass % of phosphorus in terms of $P_2O_5$,
   (2) the support loading a metal in Group 6A of the periodic table, and a metal in Group 8 of the periodic table,
   (3) the hydrotreating catalyst having a specific surface area of 150 m²/g or more,
   (4) the hydrotreating catalyst having a total pore volume of 0.40 to 0.75 ml/g as measured by a mercury intrusion method,
   (5) the hydrotreating catalyst having two maximal peaks in a pore diameter range of 6 nm to 13 nm in a log differential pore volume distribution measured by a mercury intrusion method,
   (6) the hydrotreating catalyst having an abrasion strength of 0.5% or less, and
   (7) the hydrotreating catalyst having a compressive strength of 15 N/mm or more.

2. The hydrotreating catalyst for hydrocarbon oil according to claim 1, wherein the metal in Group 6A of the periodic table is at least one of chromium, molybdenum, and tungsten, and the metal in Group 8 of the periodic table is at least one of iron, nickel, and cobalt.

3. A method for hydrotreating a hydrocarbon oil, the method comprising contacting the hydrocarbon oil to the hydrotreating catalyst of claim 2 at a temperature of 350 to 450° C., a pressure of 3 to 20 MPa, and a liquid hourly space velocity of 0.1 to 3 hr⁻¹ in the presence of hydrogen.

4. The hydrotreating catalyst for hydrocarbon oil according to claim 1, wherein the support has an absorbance ratio Sb/Sa of 0.30 to 0.60, wherein Sb is the absorbance Sb of a spectral peak in a wavenumber range of 3,770 to 3,774 cm⁻¹ corresponding to a basic OH group, and Sa is the absorbance Sa of a spectral peak in a wavenumber range of 3,674 to 3,678 cm⁻¹ corresponding to an acidic OH group as measured with a transmission Fourier transformation infrared spectrophotometer.

5. A method for hydrotreating a hydrocarbon oil, the method comprising contacting the hydrocarbon oil to the hydrotreating catalyst of claim 4 at a temperature of 350 to 450° C., a pressure of 3 to 20 MPa, and a liquid hourly space velocity of 0.1 to 3 hr⁻¹ in the presence of hydrogen.

6. A method for hydrotreating a hydrocarbon oil, the method comprising contacting the hydrocarbon oil to the hydrotreating catalyst of claim 1 at a temperature of 350 to 450° C., a pressure of 3 to 20 MPa, and a liquid hourly space velocity of 0.1 to 3 hr⁻¹ in the presence of hydrogen.

7. A process for producing a hydrotreating catalyst for hydrocarbon oil using an alumina-phosphorus mixture support,
   the process comprising:
   (1) a first step of adding a basic aqueous aluminum salt solution to an acidic aqueous aluminum salt solution having an adjusted pH of 2 to 5 to make the pH 7 to 10, and washing the resulting alumina hydrate to obtain an alumina hydrate (A) that is free of a by-product salt;
   (2) a second step of adding an acidic aqueous aluminum salt solution to a basic aqueous aluminum salt solution to make the pH 6 to 8, and washing the resulting alumina hydrate to obtain an alumina hydrate (B) that is free of a by-product salt;
   (3) a third step of mixing the alumina hydrates (A) and (B), and adding phosphorus to the mixture to obtain an alumina-phosphorus hydrate;
   (4) a fourth step of aging, kneading, molding, drying, and firing the alumina-phosphorus hydrate in series to obtain an alumina-phosphorus mixture support; and
   (5) a fifth step of loading a metal in Group 6A of the periodic table, and a metal in Group 8 of the periodic table on the support.

* * * * *